(12) United States Patent
Miu et al.

(10) Patent No.: US 11,743,248 B2
(45) Date of Patent: Aug. 29, 2023

(54) ONBOARD VEHICLE DIGITAL IDENTIFICATION TRANSMISSION

(71) Applicant: Idemia Identity & Security USA LLC, Reston, VA (US)

(72) Inventors: Stephen Miu, Chelmsford, MA (US); Daniel Poder, Brookline, MA (US); Yecheng Wu, Lexington, MA (US)

(73) Assignee: Idemia Identity & Security USA LLC, Reston, VA (US)

( * ) Notice: Subject to any disclaimer, the term of this patent is extended or adjusted under 35 U.S.C. 154(b) by 0 days.

(21) Appl. No.: 17/701,163

(22) Filed: Mar. 22, 2022

(65) Prior Publication Data

US 2022/0217134 A1 Jul. 7, 2022

Related U.S. Application Data

(63) Continuation of application No. 16/913,257, filed on Jun. 26, 2020, now Pat. No. 11,444,933, which is a
(Continued)

(51) Int. Cl.
| | |
|---|---|
| *G06F 21/30* | (2013.01) |
| *H04L 9/32* | (2006.01) |
| *H04L 9/40* | (2022.01) |
| *G06Q 50/26* | (2012.01) |
| *G09C 5/00* | (2006.01) |

(Continued)

(52) U.S. Cl.
CPC ....... *H04L 63/0823* (2013.01); *G06Q 50/265* (2013.01); *G09C 5/00* (2013.01); *H04L 9/3231* (2013.01); *H04L 63/0861* (2013.01);

*H04W 12/06* (2013.01); *H04W 12/062* (2021.01); *H04W 12/068* (2021.01);
(Continued)

(58) Field of Classification Search
CPC ............ H04L 63/10; H04L 9/32; G06F 21/30
See application file for complete search history.

(56) References Cited

U.S. PATENT DOCUMENTS

| | | |
|---|---|---|
| 5,521,815 A | 5/1996 | Rose, Jr. |
| 9,083,581 B1 | 7/2015 | Addepalli et al. |

(Continued)

FOREIGN PATENT DOCUMENTS

| | | |
|---|---|---|
| CN | 104477163 A | 4/2015 |
| WO | 2015081899 A1 | 6/2015 |

*Primary Examiner* — Izunna Okeke
(74) *Attorney, Agent, or Firm* — Armstrong Teasdale LLP

(57) ABSTRACT

A computer-implemented method includes: establishing a connection between a user device of a user and a system onboard a vehicle being driven by the user; requesting access, through the established connection, to user information on the user device; in response to a grant of access, retrieving at least a portion of the user information from the user device, the portion of user information including a digital identification document of the user that had been issued by an entity after having vetted the user, the digital identification document including a digital biometric of the user as well as a digital watermark indicating the issuing entity; and retaining, on the system onboard the vehicle, data encoding the digital identification document of the user on the vehicle such that when the vehicle is inspected by a third-party agent, the digital identification document of the user is presented to the third-party agent.

20 Claims, 8 Drawing Sheets

Related U.S. Application Data continuation of application No. 15/392,261, filed on Dec. 28, 2016, now Pat. No. 10,701,059.

(60) Provisional application No. 62/272,434, filed on Dec. 29, 2015.

(51) Int. Cl.
*H04W 12/06* (2021.01)
*H04W 12/08* (2021.01)
*H04W 12/062* (2021.01)
*H04W 12/084* (2021.01)

(52) U.S. Cl.
CPC ......... *H04W 12/08* (2013.01); *H04W 12/084* (2021.01); *H04L 2209/84* (2013.01)

(56) References Cited

U.S. PATENT DOCUMENTS

| | | |
|---|---|---|
| 10,701,059 B2 | 6/2020 | Miu et al. |
| 2006/0041513 A1* | 2/2006 | Yuhara ............... B60R 25/04 |
| | | 705/59 |
| 2015/0039366 A1 | 2/2015 | Haque |
| 2015/0358166 A1* | 12/2015 | Redpath ............ H04L 9/3247 |
| | | 713/176 |
| 2017/0169422 A1 | 6/2017 | Ye et al. |

* cited by examiner

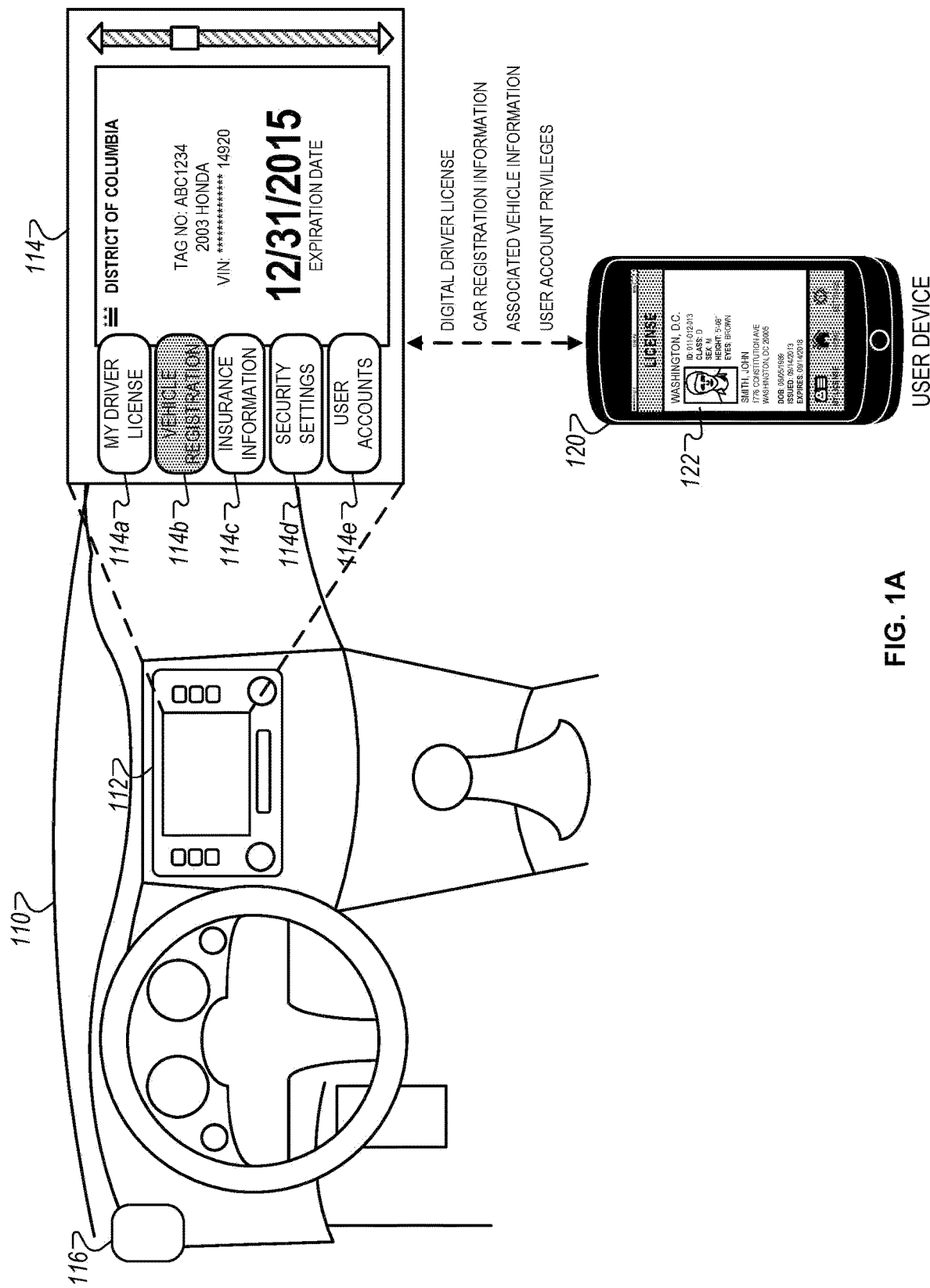

ONBOARD VEHICLE DIGITAL IDENTIFICATION TRANSMISSION

CROSS-REFERENCE TO RELATED APPLICATION

This is a continuation and claims the benefit of U.S. patent application Ser. No. 16/913,257, filed Jun. 26, 2020, which is a continuation and claims the benefit of U.S. patent application Ser. No. 15/392,261, filed Dec. 28, 2016, now issued U.S. Pat. No. 10,701,059, which claims priority under 35 USC § 119(e) to U.S. Provisional Patent Application No. 62/272,434, filed on Dec. 29, 2015, each of which is hereby incorporated by reference in its entirety.

FIELD

The present specification is related generally to digital identifications.

BACKGROUND

Information from physical documents such as driver licenses, insurance policies, and vehicle registrations are often retrieved to verify the identity of an individual driving a vehicle and retrieve pertinent information related to the vehicle.

SUMMARY

Documentation related to a vehicle such as a driver license, vehicle registration, and insurance policy information are commonly stored as physical documents within a vehicle. However, because such documentation is periodically updated, a user often needs to physically replace such documentation within a vehicle. Such documents are also often difficult to retrieve during emergency circumstances and/or are susceptible to be lost over time. Thus, in certain circumstances, users are often unable to adequately access pertinent information in a timely manner.

Accordingly, one innovative aspect described throughout this specification includes methods that transmit user information of a digital identification from a user device to an onboard vehicle system within a vehicle. The user information may include information related to a digital driver identification, a vehicle registration, and/or an insurance policy that are stored on the user device. The user information may additionally include encoded information related to security features, instructions for actions to be performed on the onboard vehicle system and/or user privileges associated with the use of the vehicle. In this regard, transmission of the user information from the user device enables more convenient access to digital formats of vehicle-related information during certain circumstances where a user may need to access the vehicle-related information.

Implementations may include one or more of the following features. For example, a computer-implemented method may include: establishing a connection between a user device and an onboard vehicle system; receiving, from the user device, user information included in a digital identification on the user device; receiving a user selection for a portion of the user information; and providing, for output on a display associated with the onboard vehicle system, the portion of the user information included in the digital identification on the user device.

The details of one or more implementations are set forth in the accompanying drawings and the description below.

Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 1A is a diagram that illustrates an example of an onboard vehicle system retaining user information from a user device of the driver of the vehicle.

In the drawings, like reference numbers represent corresponding parts throughout.

DETAILED DESCRIPTION

Figure 1B:
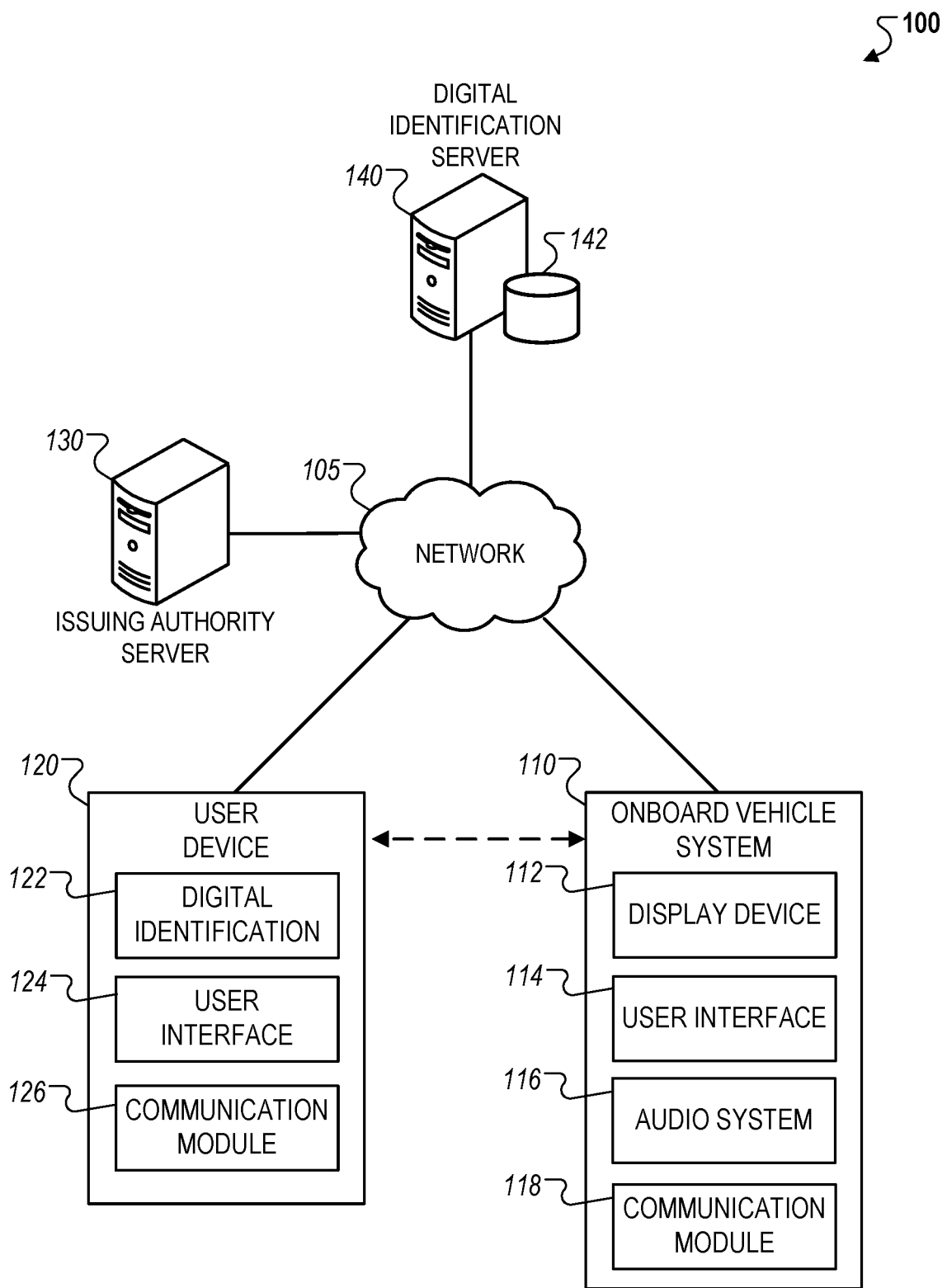
FIG. 1B is a block diagram that illustrates an example of a system for transmitting user information including a digital identification document onto an onboard vehicle system.

The specification describes methods and systems for a user device to interact with a vehicle so that a status of the user or a status of the vehicle can be determined in an efficient and judicious manner. In one instance, user information may be transmitted from a user device of a user to a system onboard a vehicle being driven by the user. The user information may include information related to a digital identification, a vehicle registration, and/or an insurance policy that are stored on the user device. The user information may be in the form of a digital identification document. The user information may additionally include encoded information related to security features, instructions for actions to be performed on the onboard vehicle system and/or user privileges associated with the use of the vehicle. In this regard, transmission of the user information from the user device enables more convenient access to relevant user or vehicle information during certain scenarios such as a traffic stop. In another example, the transmission may allow the onboard system on the vehicle to display or communicate information including a digital driver's license to a law enforcement officer during a frisk and stop operation. The information may also be communicated to a computing device carried by the law enforcement officer. This data communication may take place even when the vehicle is in operation on a highway. The information may additionally include, for example, insurance policy information carried by the user.

In another case, a connection is established between a user device and a system on board a vehicle for the user device to receive information from the onboard vehicle system. In this case, the vehicle information may include vehicle title information, vehicle registration information, or vehicle identification (VIN). In particular, the VIN information may be backed by a public key of the manufacturer. The title and registration information may include the entire registration and title history, with each change or update chained to the last transaction and backed up by, for example, digital watermark of the department of motor vehicle (DMV) authorizing the record update/change. Such vehicle information may additionally include maintenance information that are chained in a similar fashion, for example, by a public key of the dealer or auto mechanics or a digital watermark of the merchant. The vehicular information may allow instant visibility into the status and history of the vehicle.

In yet another case, once a connection is established between a user device and a system on board a vehicle, user information may be transmitted from the user device to the onboard vehicle system. The user information may be in the form of a digital driver's license. In this case, the onboard vehicle system may compare the user information from the digital driver's license with a database of authorized drivers or subscribed users to determine whether the user is an authorized driver of the vehicle. If the user is indeed an authorized driver, the vehicle will be unlocked for the user to take control. In some cases, this unlocking may release all mechanic and electronic locks of the steering wheels, the brakes, the stick, and the front panel. The unlocking may be in response to a successful validation that the user's digital driver's license as well as a match of the user's name in the database of permitted drivers. In some cases, the user information may be compared to a list of riders currently subscribing to the service. In other cases, the vehicle information may be obtained at the user's mobile device so that a decision is made as to whether the vehicle is a legitimate vehicle that the user has requested (or subscribed for service). In such cases, the vehicle can include an autonomous vehicle. Indeed, implementations disclosed herein enable autonomous navigation and facilitates sharing of vehicular position and telemetry information as well as information of certification/approval for road-worthiness of the vehicle.

FIG. 1A is a diagram that illustrates an example of a system 100 on board a vehicle. System 100 may display user information from, for example, a digital identification document. Briefly, system 110 may include a display device 112 that provides an interface 114 to a user and an audio system 116 that provides audio playback. Here, the user generally refers to the operator of the vehicle. User information may be displayed on the interface 114 based on exchanging data transmissions with a user device 120. The user device 120 may have a digital identification 122 that includes user information that can be displayed on the display 112. User device may include a mobile computing device that the user can carry. Examples include a smartphone device, a tablet device, or a wearable device.

The user information displayed on the interface 114 may include driver license information 114a, a vehicle registration 114b, insurance information 114c, security settings 114d, and/or user account information 114e. Driver license information 114a may be information associated with a digital driver license stored on the user device. The digital driver's license may generally include all features and appearances of a physical driver's license. The user information may be transmitted from the user device 120 to the onboard vehicle system 110 via a wireless or wired communication protocol such as Bluetooth, Wi-Fi, or universal serial bus (USB). When the digital driver license includes covert features, the transmitted user information may not reveal covert information otherwise embedded in the digital identification document.

In the example depicted in FIG. 1A, the onboard vehicle system 110 exchange data transmissions with the user device 120 that include the vehicle registration 114b. After exchanging the data transmissions, the vehicle registration 114b is available for display on the interface 114. The vehicle registration 114b is applicable to certification for autonomous vehicle. The onboard vehicle system is a computing device that includes at least one processor and a display (for user interactions). The onboard vehicle system may be incorporated into, or in communication with, for example, a global positioning system (GPS), an On-Star® auto security and navigation system. As illustrated, electronic content stored on the user device 120 is transmitted to the onboard vehicle system 112 such that the electronic content is accessible in lieu of paper documentation.

A user may use the interface 114 in various circumstances. In one example, the user may use the interface 114 to retrieve pertinent information during emergency services. For instance, during a service call with emergency roadside assistance, the user may transmit the user information displayed on the interface 114 to a designated emergency recipient in order to provide information related to the vehicle (e.g., the vehicle registration 114b and the insurance information 114c). In one such instance, the interface 114 may include an option to transmit the user information displayed as a data package to the designated emergency recipient. In this instance, the transmission can be automatic so that information is dispensed to a device of the ambulatory personnel as they arrive.

In another example, a user may use the interface 114 to transmit requested information during, for example, a stop-and-frisk operation, by a law enforcement officer. For instance, upon receiving a request for a driver's license and vehicle information, instead of providing the law enforcement with paper documentation, the user may instead utilize the interface 114 to retrieve up-to-date information associated with the digital identification 122. In such an instance, because the user device 120 periodically updates the user information by accessing the user's system of record on a backend server, the information displayed on the interface 114 may reflect more accurate information compared to the paper documentation. Because user information has been obtained by the onboard vehicle system beforehand, rendering the same information on a display of the onboard vehicle system provides a seamless information exchange without resorting to physical copies that could be easily misplaced due to lack of use. In certain cases, the information exchange is between the onboard vehicle system and a user device of the law enforcement officer. Information exchange in this manner can provide the law enforcement officer with the additional advantage of visualizing current information of the driver on a display of the user device of the law enforcement officer to save the law enforcement from entering into the vehicle. What is more, information of the driver is up-to-date; and security features, such as digital watermarks, that accompany the transmitted information attest to the validity of the information.

In certain cases, such information exchange/transmission may occur while the vehicle has not been stopped, for example, when the vehicle is moving on a highway. For illustration, the information encoding the user's digital driver's license may be transmitted from the onboard vehicle system to a device of the police officer. The police officer may be cruising on the highway and may be prompted to search for more details from surrounding vehicles, for example, during an amber alert. The police officer may also inspect such information from a display of the onboard vehicle system after a regular traffic stop (e.g., stop-and-frisk). In these cases involving moving/non-stopped vehicles, information may be exchanged between autonomous vehicles. As an illustrative example, the presence of a vehicle and its registration/license information may be proactively broadcast to its surroundings and received by a neighboring vehicle. In this manner, a vehicle can sense its neighbors. Indeed, this information may complement information from other sensors such as cameras and motion sensors. In case of accidents involving two or more vehicles, insurance information may be exchanged in a likewise manner.

In another example, a user may use the interface 114 to establish an identity or privilege for using a vehicle during a traffic stop if he/she is not the vehicle owner or the user associated with the vehicle registration 114b. For instance, as described more particularly with respect to FIG. 2, an acquaintance of the vehicle owner may be associated with the vehicle owner's account. The association may be created by establishing a limited user profile associated with the user device of the acquaintance. In such an instance, after being stopped by a law enforcement officer and being requested for the vehicle registration 114b, the acquaintance may navigate to the user accounts 114e to display the user profile indicating that the vehicle owner has consented to the use of the vehicle by the acquaintance. In this regard, the interface 114 may be used to establish a user identity associated with a vehicle that may not necessarily be reflected within documents of record regarding ownership or registration of the vehicle.

In some implementations, the user information transmitted from the user device 120 may be used to authenticate a user prior to providing access to driving. In such examples, the user information may include security settings 114d that specify user credential data associated with the digital identification 122 on the user device. For example, the onboard vehicle system 110 may be configured to provide access to digital identifications that are specified by the vehicle owner. In this regard, the onboard vehicle system 110 may be used as a security feature to protect against vehicle theft in circumstances where the vehicle owner or another user has lost the vehicle keys or has the keys stolen from them.

In other instances, such security features are used to unlock the vehicle so that the user may become the driver. In particular, the onboard vehicle system may verify the security features from the digital driver's license to determine whether the digital document is legitimate. A legitimate copy is a valid copy that has the requisite security features but without signs of being tampered with. If the digital identity document is determined to be legitimate and valid, the onboard vehicle system may additionally verify the identity information from the digital identity document with a third party database. In some instances, the third-party database is a remote database housing identity data that has been vetted by an authority, such as the department of motor vehicles (DMV) or the state department. If the identity information is further validated as in agreement with vetted entries already in the third-party database, the vehicle may be unlocked for the user to take over the driver seat. In this case, the user may obtain full access to operate the vehicle, including the engine system, the ignition system, and the brake system. In particular, this unlocking mechanism may be combined with a biometric verification, for example, by using a finger-print or a facial portrait. This biometric aspect, when combined with the aspect of validating the digital driver's license, can form a "two-factor" process. First, the person attempting access may have his digital identification document, such as a digital driver's license, validated by the system onboard vehicle, as discussed above. Second, the person may prove he or she is the person identified by presenting a biometric to the system onboard the vehicle. For example, the user may present a finger-print on the stick or on the steering wheel. The user may also stare at the rear-looking mirror to have his or her facial biometric taken. The acquired biometric in-situ may be compared with the biometric information on the digital identification document, which had been vetted by an authoritative source, such as the DMV.

FIG. 1B is a block diagram that illustrates an example of a system 100 for transmitting user information from the user device 120 onto the onboard vehicle system 110. Briefly, the system 100 may include the onboard vehicle system 110, the user device 120, an issuing authority server 130, and a digital identification server 140. The components of the system 100 may exchange communications over a network 105. The information of the user may reside on user device 120. The information may also reside in the cloud and ready to be retrieved on-demand. Once communicated to onboard vehicle system 110, the user information may reside on onboard vehicle system 110.

The network 105 may include one or more of the Internet, a Wide Area Network (WAN), a Local Area Network (LAN), analog or digital wired and wireless telephone networks (e.g., a public switched telephone network (PTSN), Integrated Services Digital Network (ISDN), a cellular network, and Digital Subscriber Line (DSL)), radio, television, cable, satellite, or any other delivery or tunneling mechanism for carrying data.

The network 105 may include multiple networks or sub-networks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network. Network 105 may also encompass near-field communication technologies, such as NFC (near-field communication), Bluetooth®, high-frequency audio communications, and infra-red communications.

The onboard vehicle system 110 may be a collection of hardware and software components that are installed into a vehicle and configured to operate based on receiving user input. For instance, the onboard vehicle system 110 may include a display device 112, an interface 114, an audio system 116, and a communication module 118. The display device 112 may be an automotive navigation system that is typically used to provide position data during a routing operation.

The display device 112 may include additional features such as receiving and transmitting phone calls via the user device 120, or providing signals to operate the other hardware or software components of the onboard vehicle system 110. The interface 114 may be a user interface that is generated on the display device 112. The interface 114 may accept user input (e.g., touch screen) that provides signals related to the operation and control of the hardware or software components of the onboard vehicle system 110. For instance, the interface 114 may include interface elements that correspond to particular operations to be performed by the components of the onboard vehicle system 110.

In some implementations, the onboard vehicle system 110 may function on a mobile operating system that provides the capability to download and install mobile applications. In such implementations, the interface 114 may be displayed within a mobile application that is configured to exchange communications with a mobile application on the user device 110. For example, the mobile applications on the onboard vehicle system 110 and the user device 120 may be digital identification applications that are configured to retrieve digital identification information from a user system of record on the digital identification database 142.

In some implementations, one or more of the hardware and software components of the onboard vehicle system 110 may be manufactured either by a vehicle manufacturer or a third party manufacturer. For instance, one or more of the hardware and software components may be after-market upgrades to the vehicle that are installed after the vehicle has been manufactured by the original equipment manufacturer (OEM). For example, the display device 112 may be a third party automotive navigation system that is installed as an add-on to the vehicle The user device 120 may be a portable electronic computing device that displays the digital identification 122 associated with a user. For instance, the user device 120 may be, for example, a smart phone, a tablet computer, a laptop computer, a personal digital assistant device, an electronic pad, a smart watch, a smart glass, or any electronic device with a display that is connected to a network. In addition, the user device 120 may include a digital identification 122, a user interface 124, and a communication module 126.

The digital identification 122 may be an electronic version of a user information that is typically provided in paper documentation. For instance, the digital identification 122 can include a digital driver license issued to a registered driver by a state department of motor vehicles. In addition, the digital identification 122 can include other types of ancillary information associated relating to a vehicle. For instance, the digital identification 122 can include vehicular insurance policy information of the user, vehicle registration information, and/or other user information associated with the use of the vehicle. The digital identification 122 may also include user credential data that are utilized as security features to restrict access to vehicle to authorized users. For example, the digital identification 122 may specify user account information that enables a user associated with the digital identification 122 to authenticate to the onboard vehicle system 110 to receive access to a vehicle of the onboard vehicle system 110. In some cases, vehicle-specific information follows the vehicle and resides on the onboard vehicle system 110. In these cases, the vehicle-specific information does not follow ownership or control, as the owner or driver changes.

The user device 120 may exchange communications with the digital identification server 140 to receive and transmit user information related to the digital identification 122, user data that is included in the digital identification, credential data used from the digital identification 122, and/or configuration settings that adjust the display of the digital identification 122 on the user device 120 and/or the onboard vehicle system 110. For example, during a verification process, when the digital identification 122 may be enabled on the user device 120, a data packet including credential data may be transmitted to the digital identification server 140 to determine whether the digital identification 122 is still valid or includes accurate information, and in response to determining that the digital identification 122 is still valid, the data back include credential data may then be transmitted to the onboard vehicle system 110. In this example, if the digital identification server 140 determines that the credential data is valid, then the digital identification may be determined to be valid and provided for display on the interface 114 of the onboard vehicle system 110. Alternatively, if the digital identification server 140 determines that the credential data is not valid, then the digital identification 122 may be determined to be invalid, and access to the vehicle may be restricted.

In some implementations the user device 120 may include a mobile application that exchanges communications to the digital identification server 140 as an application server and the onboard vehicle system 110 as a client. For example, the mobile application may be associated with a user account that is stored on the digital identification database 142. In addition, the mobile application may periodically exchange information related to the security status assigned by the digital identification server 140 to determine whether the digital identification 122 is valid. In some instances, the mobile application may additionally or alternatively include various displays of the mobile application such that the mobile application may be used as a replacement form of identification to a physical identification card, or be displayed on the interface 114.

The issuing authority server 130 may be a remote server that is operated by the issuing authority (e.g., a state department of motor vehicles) and used to control access to secure user information that is included in physical identification cards issued by the issuing authority. For instance, the issuing authority server 130 may provide access to demographic information of users, historical information associated with users (e.g., previous identification cards issued, number of renewals, etc.), and/or other types of user information using authorization procedures that require validation of access credentials. For example, upon receiving a request for the secure user information by the digital identification server 140, the issuing authority server 130 may require an exchange of the access credentials to validate an authorized request.

The issuing authority server 130 may be queried by the digital identification server 140 for secure user information during a digital identification operation. For instance, during an enrollment process, after a user has opted to enroll into a digital identification program, the digital identification server 140 may query the issuing authority server 130 using a user identifier number to extract secure user information to be included in a generated digital identification 122. In another example, during a verification operation, the digital identification server 140 may access the issuing authority server 130 to determine whether a digital identification 122 for a user includes false user information indicative of a fraudulent digital identification 122.

In some implementations, the issuing authority server 130 may be configured with additional security protocols compared to the digital identification server 140 to protect sensitive user information associated with the user. For instance, in some instances, the issuing authority server 130 may be associated with a Federal government agency that manages nationwide programs that require specialized access (e.g., a government clearance). In such instances, the digital identification server 140 may be configured to access the secure user information stored within the issuing authority server 130 under a special security agreement that ensures that the exchange of the secure user information is controlled and regulated according to Federal privacy statutes. For example, the issuing authority server 130 may track information related to each exchange with the digital identification server 140 such that in the event that the digital identification server 140 determines that a particular digital identification 122 is invalid, a notification may be received by the issuing authority server 130 to take additional security measures to protect more sensitive user information that may be associated with, but not included in, the digital identification 122. In this regard, the communication exchange between the digital identification server 140 and the issuing authority server 130 may be utilized to ensure protection of user information beyond the user information included in the digital identification 122.

In some implementations, the system may include one or more additional issuing authorities such as an insurance company that provides vehicular insurance to a user. In such implementations, the issuing authority server 130 may store insurance-related information (e.g., policy information, previously submitted insurance claims, coverage details, etc.) associated with a vehicle. In this regard, the user device 120 may query the issuing authority server associated with the insurance company to retrieve insurance information, which can then be included within the digital identification 122.

The digital identification server 140 may be a remote server that is monitored and operated by an organization or institution that is authorized by an identification issuing authority to provide the digital identification 122 to a user. In some instances, the organization or institution operating the digital identification server 140 may be an organization that is designated by the identification issuing authority (e.g., state department of motor vehicles) to access identification information for a plurality of users who have been issued a physical identification card. In other instances, the organization or institution operating the digital identification server 140 may be the identification issuing authority (e.g., a government institution) that issues a plurality of users with a physical identification card.

The digital identification server 140 may coordinate and administer the backend processes that are involved in provisioning a digital identification to the plurality of users that have been issued a physical identification from the identification issuing authority. For instance, the digital identification server 140 may initiate processes to enroll users with the digital identification 122, and operate security protocols to detect potential fraudulent use or privacy breaches associated with the digital identifications. In some instances, the processes related to the digital identification 122, as described above, may be coordinated with the issuing authority server 130, to ensure that secure user information that includes personally identifiable information are not exposed during the provisioning of the digital identification 122.

As described, secure user information may refer to user information within the digital identification 122 that may include personally identifiable information associated with the user such as, for example, social security numbers, place of residence, and/or other demographic information that is associated with other types of information that the user considers private. In addition, the secure user information may include medical records of the user that are protected under the Health Insurance Portability and Accountability Act of 1996 (HIPAA). Access to the secure user information within the digital identification 122 may be restricted by the digital identification server 140 by the using particular authorization procedures (e.g., requiring of user access codes) to access the secure information on the user device 120.

The digital identification server 140 may exchange communications with the digital identification database 142, which includes user information for enrolled users and/or other configuration details related to the digital identification program. For instance, the digital identification database 142 may include a user entry associated with a user that includes account information associated with enrolled users, and any type of user information that may be provided by the user during a digital identification enrollment process.

In some implementations, the digital identification database 142 may include user entries for both users that are enrolled in the digital identification program and potential users that the digital identification server 140 has identified as users that are likely to enroll in the digital identification program. For example, the digital identification database 142 may include a field that indicates whether a user entry is associated with an enrolled user or a potential user. In such implementations, the digital identification database 142 may be accessed by the digital identification server 140 to retrieve user information for the digital identification 122 associated with an enrolled user, and user information for a candidate user in order to send an enrollment email that provides an enrollment code to the candidate user.

In some implementations, the user entry for enrolled users may be automatically created by the digital identification server 140 within the digital identification database 142. In such implementations, the user may submit an online enrollment form including a set of user fields for providing user information. In response, the digital identification server 140 may initiate a computer-implemented procedure that automatically generates a user entry for the user in the digital identification database 142 and inserts the values submitted for the set of user fields as user information that is included in the user entry.

In some implementations, the digital identification server 140 may additionally exchange communications with an image server, which stores photographs associated with a user identification card. In some implementations, the image server may be operated by a separate entity or organization that operates the digital identification server 140. For instance, in such implementations, the image server may be operated by the identification issuing authority. In other implementations, the image server may be operated by the authorized issuing authority that also operates the digital identification server 140. In such implementations, the image server may be a sub-component of the digital identification server 140.

Figure 2:
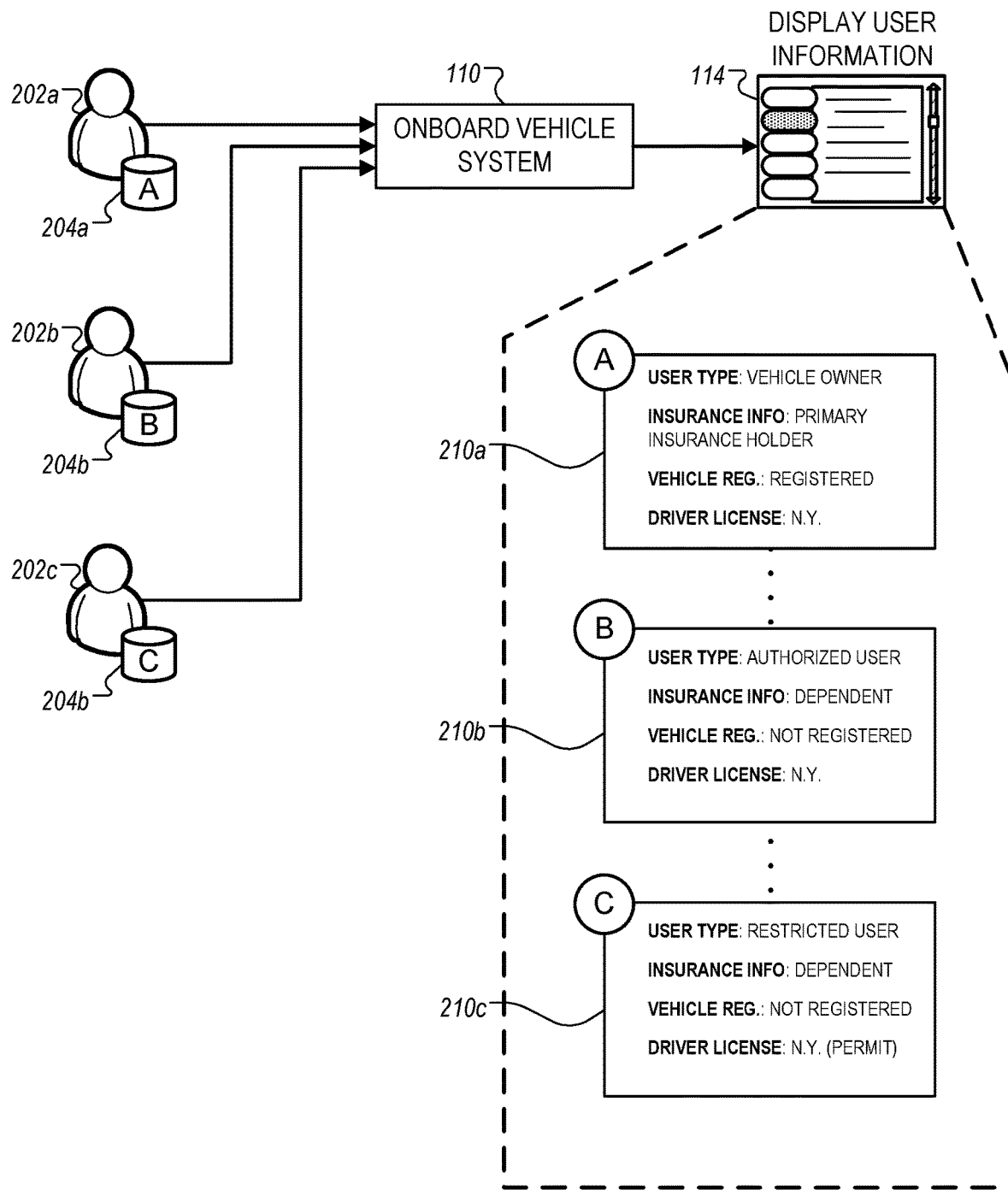
FIG. 2 is a diagram that illustrates examples of user identities associated with information that is displayed on an onboard vehicle system.

FIG. 2 is a diagram that illustrates examples of user accounts associated with information that is displayed on an onboard vehicle system. As depicted, the onboard vehicle system 110 may receive transmissions from user devices associated with users 202*a*, 202*b*, and 202*c* and display respective user information associated each of the users 210*a*, 210*b*, and 210*c*.

The users 202*a*, 202*b*, and 202*c* may be different users that use a single vehicle (e.g., individuals of a family that use a family car, different classes of employees that use a company issued vehicle, group of friends that share a car, etc.). The users 202*a*, 202*b*, and 202*c* may be associated with user accounts 204*a*, 204*b*, and 204*c*, respectively, that are stored on the digital identification server 140. Through seat sensors, biometric information may be taken from the driver and hence the actual driver can be identified. Briefly referring to FIG. 1, in some cases, the interface 114 may provide directives to the user to select, for example, one menu choice representing a particular person, as the driver to assume responsibilities of the vehicle.

In the example depicted in FIG. 2, the user 202*a* is a vehicle owner, the primary insurance holder, and the individual the vehicle registration indicates the vehicle is registered to. In this example, the onboard vehicle system 110 displays the user's status and indicates that the user has full privileges to use the vehicle. The user 202*b* is an authorized user that is not the vehicle owner but an acquaintance of the vehicle owner, who the insurance policy information indicates is a dependent of the user 202*a*. In addition, the vehicle registration for the vehicle indicates that the user 202*b* is not registered to the vehicle. Accordingly, the user 202*b* may have a subset of the privileges of the user 202*a* in that some control aspects over the vehicle may be limited based on the status of the user 202*b* (e.g., updating vehicle service information). The user 202*c* is a restricted user that is also not the vehicle owner and also has a provisional driver license, who the insurance policy information indicates is also a dependent on the user 202*a*. For example, the user 202*c* may be an adolescent that is not of legal age to obtain full driver's license. Accordingly, the user 202*c* may have further restrictions on privileges compared to the user 202*b* given his/her provisional driver license status and user type (e.g., speed limit restrictions, pre-selected regions for driving, etc.

In some implementations, the set of user privileges may be used to provide different types of vehicle access to users based on their user type, legal status of a driver license, and/or title on the vehicle registration. In this regard, user information transmitted from the digital identification 122 can be used to initially classify users, and provide the appropriate level of vehicle access based on the classification. For example, as described above, a vehicle owner may utilize the onboard vehicle system 110 to specify a set of parental safety options that prevents a restricted user from using a vehicle in a dangerous manner (e.g., speeding beyond a preset threshold speed limit, accessing the vehicle during certain time periods, or using the vehicle beyond a set threshold distance amount). In some instances, only qualified users may handle certain types of vehicles. As an illustration, school buses, construction vehicles, or utility vans may require separate permits. Hence, access to these types of vehicles may be restricted to subset of drivers who had been qualified or trained to operate specialized vehicles. In other instances, only drivers above a legal age and without physical impairment (such as legal blindness) may operate vehicles. In still other cases, driving in certain geographic areas may be restricted to qualified drivers for efficiency or security concerns. Such situations may include operating vehicles at an airport, a military base, or a security zone.

Figure 3A:
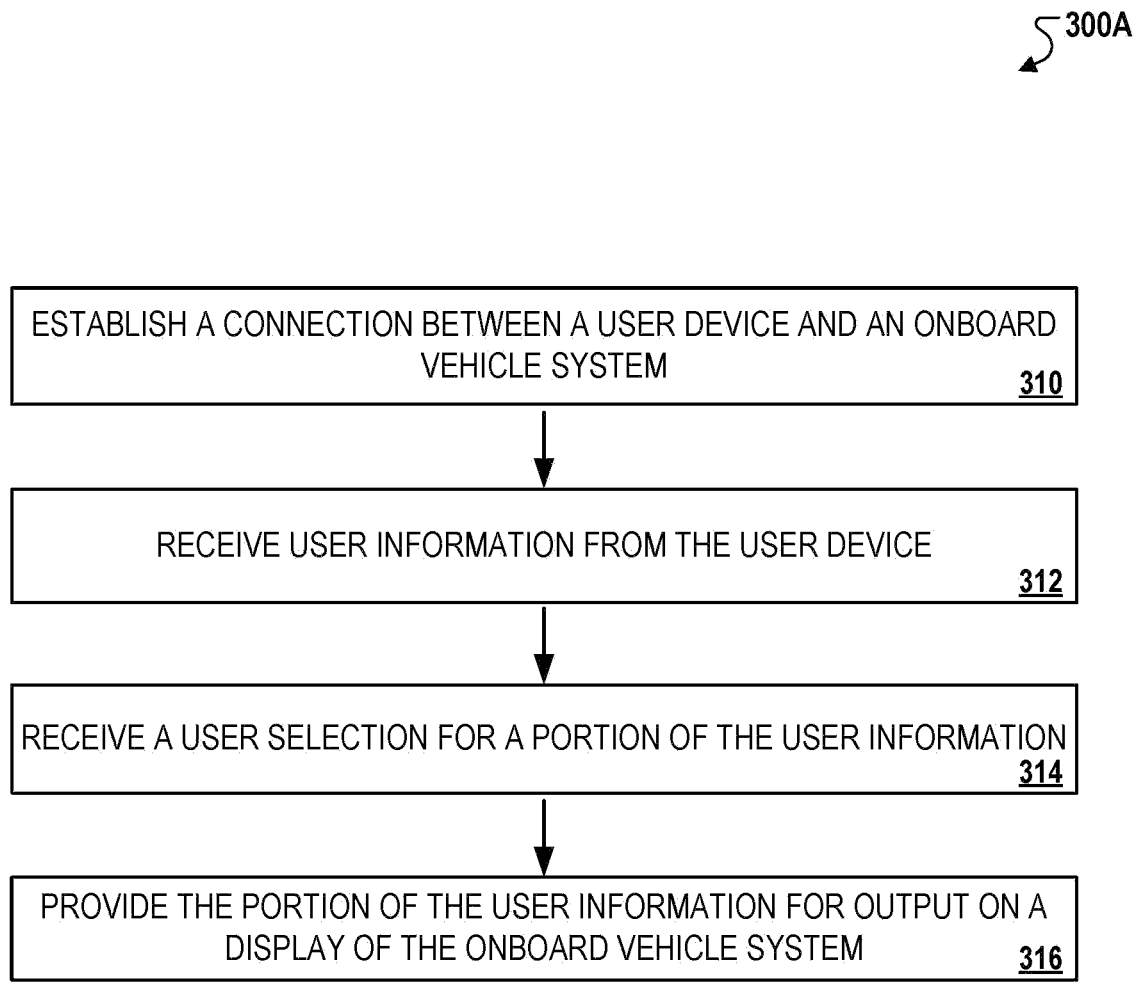
FIGS. 3A to 3E are block diagrams that each illustrates an example of a process for information exchange between a user device and on an onboard vehicle system.

FIG. 3A is a block diagram that illustrates an example of a process 300A for transmitting user information for display on an onboard vehicle system. Briefly, the process 300A may include establishing a connection between a user device and an onboard vehicle system (310), receiving user information from the user device (320), receiving a user selection for a portion of the user information (330), and providing the portion of the user information for output on a display of the onboard vehicle system (340).

In more detail, the process 300A may include establishing a connection between a user device and an onboard vehicle system (310). For instance, the user device 120 may establish a connection with the onboard vehicle system 110. The connection may be one or more of a Bluetooth connection, a Wi-Fi connection, an infra-red connection, a cellular connection, and/or any other suitable wireless communication protocol. In some cases, the connection may be established by wired connections, such as USB (universal serial bus) or firewire (IEEE 1394) connections. The connection may only be established when the onboard vehicle system 110 can verify the user device as a trusted device. This verification may be performed by the onboard vehicle system 110 polling the user device for information indicating that the user device (or the app on the user device) has been vetted. The information may be preloaded on the user device through the earlier vetting process. In some cases, the information may be embedded in the firmware of the user device. In other cases, the information may be downloaded from the trusted vetting party. As the connection process is user-centric, the onboard vehicle system 110 may also poll the user, through the user device, information such as password, pass code, or answers to security questions to enable user information to be transmitted from the user device to the onboard vehicle system 110.

In some instances, the connection may be established when there had been prior instances of the user device being plugged into the onboard vehicle system 110. In these instances, after establishing the connection between the user device 120 and the onboard vehicle system 110, a data synchronization operation may be performed such that updates to the digital identification 122 since the last connection session are transmitted to the onboard vehicle system 110.

The process 300A may include receiving user information from the user device (312). For instance, the onboard vehicle system 120 may receive user information included in the digital identification 122 on the user device 120 over the established connection. For example, as described with respect to FIG. 1A, the user information may include driver license information, vehicle registration information, insurance coverage information, security setting, and/or user account settings. In particular, the user information may include a digital driver's license of the user. A copy of verified attributes from an authenticated credential may be transmitted to the onboard vehicle system 110. This copy may be dedicated for a rendering software application on the onboard vehicle system 110. This copy may not be retransmitted from the onboard vehicle system 110. In some instances, the copy may expire and timeout, so that the copy is set to disappear after a period of time.

The process 300A may include receiving, at the onboard vehicle system, a user selection for a portion of the user information (314). In some instances, the user may select a portion of the user information to view on a display of the onboard vehicle system 110 from the user device 120. In one illustration, the user device 122 may initially process a user selection on a user interface of the user device 122, and in response, provide an indication of the user selection and an instruction to display the user selection to the onboard vehicle system 110. In another instance, the user may select the portion of the user information on the interface 114 of the onboard vehicle system 110. For example, the user may navigate to an interface element that corresponds to the portion of the user information as depicted in FIG. 1A.

The process 300A may include providing the portion of the user information for output on a display of the onboard vehicle system (316). For instance, in response to receiving the user selection of the portion of the user information, the onboard vehicle system 110 may provide the portion of the user information for output on a display. As depicted in the example in FIG. 1A, the portion of the user information may be displayed on the interface 112. For example, during a stop-and-frisk operation, the digital driver's license of the driver may be displayed to an inspecting law enforcement officer. This example is applicable for a driver of a rental car as well.

FIG. 3A is a block diagram that illustrates an example of a process 300A for transmitting user information for display on an onboard vehicle system. Briefly, the process 300A may include establishing a connection between a user device and an onboard vehicle system (310), receiving user information from the user device (320), receiving a user selection for a portion of the user information (330), and providing the portion of the user information for output on a display of the onboard vehicle system (340).

In more detail, the process 300A may include establishing a connection between a user device and an onboard vehicle system (310). For instance, the user device 120 may establish a connection with the onboard vehicle system 110. The connection may be one or more of a Bluetooth connection, a Wi-Fi connection, an infra-red connection, a cellular connection, and/or any other suitable wireless communication protocol. In some cases, the connection may be established by wired connections, such as USB (universal serial bus), firewire (IEEE 1394), OBD (OnBoard diagnostics systems), or variations. The connection may only be established when the onboard vehicle system 110 can verify the user device as a trusted device. This verification may be performed by the onboard vehicle system 110 polling the user device for information indicating that the user device (or the app on the user device) has been vetted. The information may be preloaded on the user device through the earlier vetting process. In some cases, the information may be embedded in the firmware of the user device. In other cases, the information may be downloaded from the trusted vetting party. As the connection process is user-centric, the onboard vehicle system 110 may also poll the user, through the user device, information such as password, pass code, or answers to security questions to enable user information to be transmitted from the user device to the onboard vehicle system 110.

In some instances, the connection may be established when there had been prior instances of the user device being plugged into the onboard vehicle system 110. In these instances, after establishing the connection between the user device 120 and the onboard vehicle system 110, a data synchronization operation may be performed such that updates to the digital identification 122 since the last connection session are transmitted to the onboard vehicle system 110.

Figure 3B:
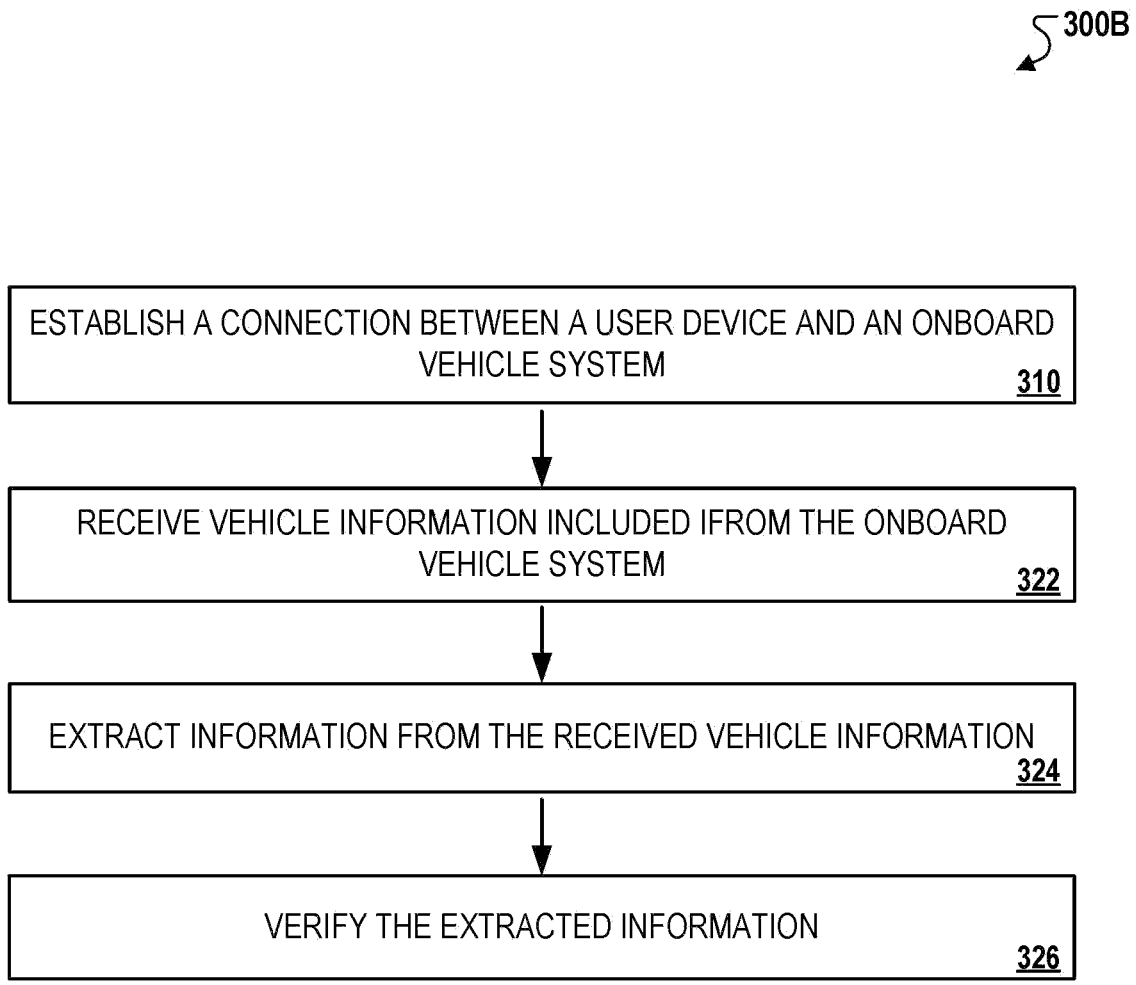

In some cases, information resident on the onboard vehicle system 110 may be transmitted to a user device of, for example, a law enforcement officer. Referring to FIG. 3B, the process 300B may include establishing a connection between a user device and an onboard vehicle system (310), receiving vehicle information from the onboard vehicle system (322), extracting information from the received vehicle information (324), and verifying the extracted information (326). The user device may need access to the onboard vehicle system 100. While establishing the connection between the user device and the onboard vehicle system 110 (310), however, the user device of the law enforcement agent may need the driver to facilitate setting up the connection. In other cases, the onboard vehicle system 100 may reserve an open channel for access by law enforcement officers. In these cases, the open channel may be tapped into by law enforcement agents on patrol and without having to stop a vehicle in transmit.

Once the connection is established, the onboard vehicle system 120 may receive user information included in the digital identification 122 on the user device 120 over the established connection (322). For example, as described with respect to FIG. 1A, the vehicle information may include vehicle registration information, insurance coverage information, vehicle maintenance information, as well as driver information. In particular, the driver information may include a digital driver's license of the user.

The process 300B may include extracting information from the received vehicle information (324). In some instances, the user device of the law enforcement agent may select a portion of the user/driver information to view on a display of user device of the law enforcement officer. For example, the user device of the law enforcement officer may choose to view the driver's digital driver's license. In other cases, the law enforcement officer may only be interested in knowing if the vehicle has been duly registered and carries the minimally required insurance that had not expired. There are occasions in which the law enforcement officer is only interested in knowing that the driver of the vehicle is not a suspect being pursued even though the vehicle may fit the profile or description of a runaway vehicle. Law enforcement official, on highway patrol, may also prefer to confirm certain truck drivers are duly licensed, qualified, and insured without having to stop these mammoth size vehicles.

The process 300B may include verifying the extracted information (326). For instance, after the driver's digital driver's license has been extracted, the user device of a law enforcement may opt to verify the information with an authoritative source, such as a system of records at the department of motor vehicles (or another entity serving as a proxy). In this scenario, the verification may leverage the identity information at the DMV that has been vetted. Similarly, the user device of the law enforcement officer may verify the vehicle registration information or the insurance status information.

Figure 3C:
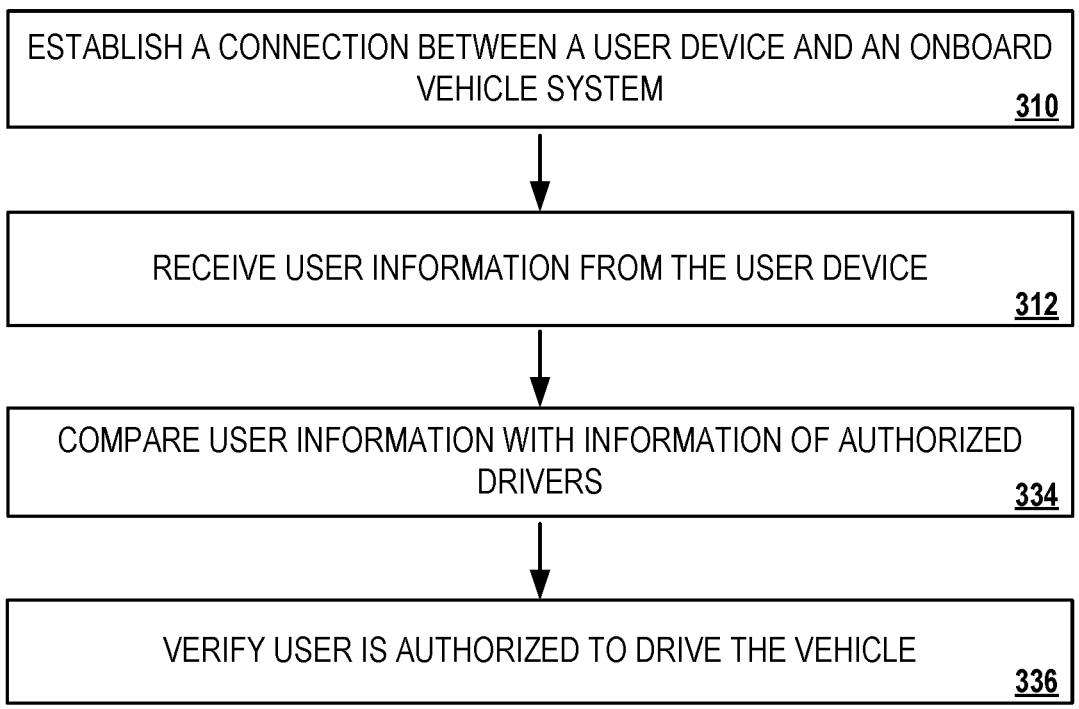
Figure 3D:
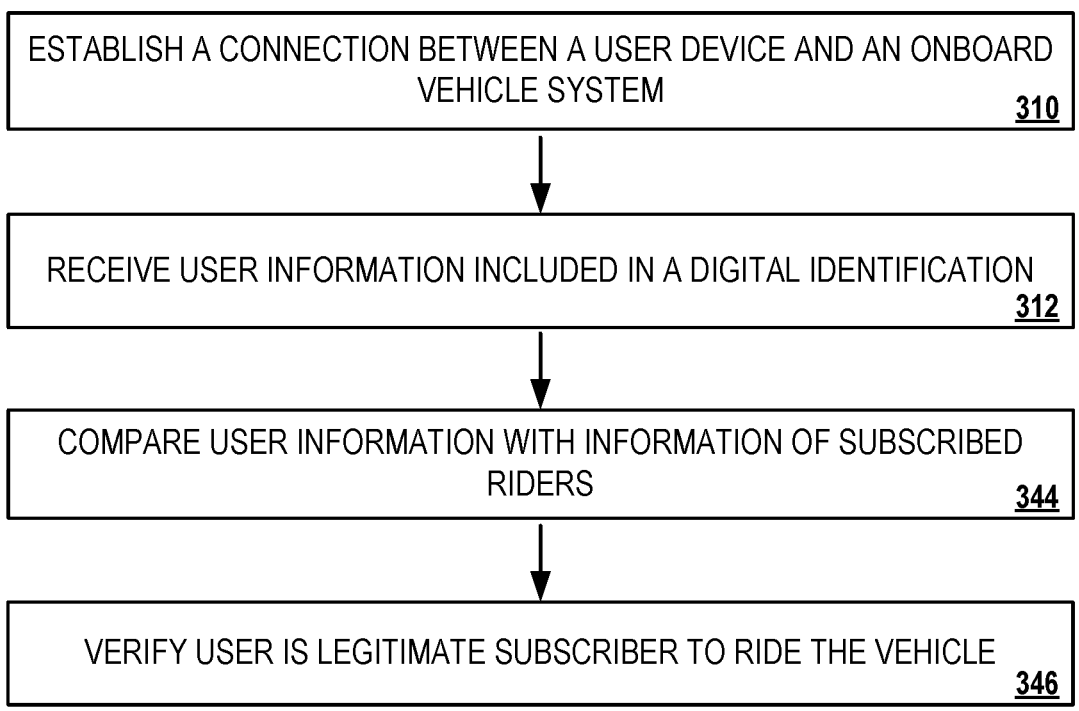
Figure 3E:
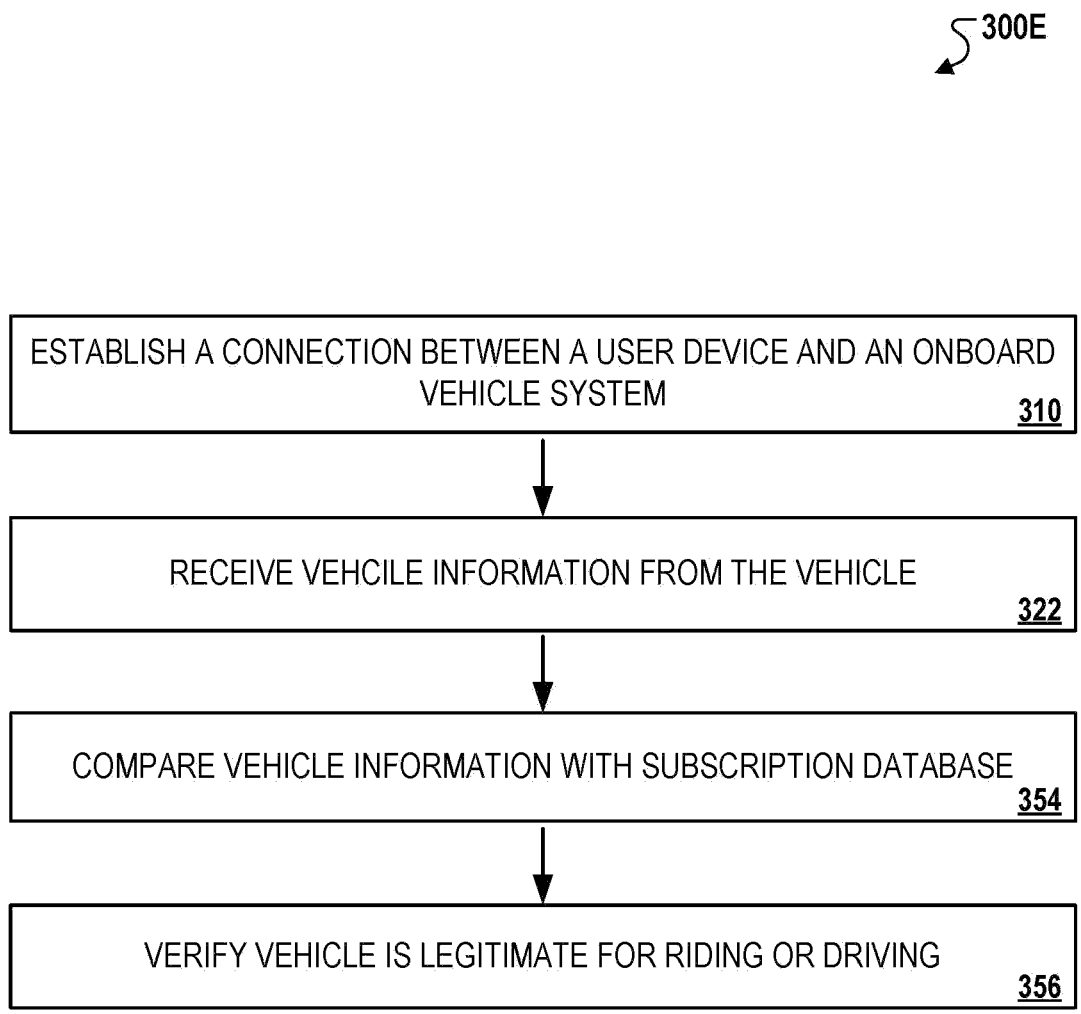

The process is equally applicable in the context of autonomous vehicles. Referring to FIGS. 3C to 3E (respectively illustrating processes 300C to 300E), a connection may be established between a user device and an onboard vehicle system (310); and then user information may be received from a user device (312) or the vehicle information may be received from the vehicle (322). Thereafter, the onboard vehicle system 110 and the user device may each intelligently interact to determine (i) whether the person attempting to drive the vehicle in a shared driving environment is authorized to drive; (ii) if the person waiting for the autonomous vehicle in a ride-share context is the legitimate rider; and (iii) if the vehicle showing up is indeed the vehicle that had been ushered in.

In a shared-driving context, a pool of drivers may jointly share driving of vehicles. This sharing may stem from joint ownership of a vehicle, or through a rental entity that functions in the nature and character of car-sharing services. In this context, the vehicle may be presented as an autonomous vehicle delivered to the driver's door step, or at a location chosen by the driver. In one illustration per FIG. 3C, the user information of the person attempting to take the driver's seat of the vehicle may be compared to information of authorized drivers (334). Comparison may be performed locally at the onboard vehicle system. Comparison may also be performed remotely by querying a database of the sharing entity. The comparison may determine if the user has been a member of the sharing club, or if the user has paid for driving the vehicle. For the driver to take the driver's seat, the onboard vehicle system may verify to determine that the user is an authorized and licensed driver (336). The verification may include querying at a system of records and determining that the user's driver license information is already in the system of records. By virtue of the vetted nature of such information at an authoritative source such as the DMV, the onboard vehicle system 110 can determine that the purported identity is valid. In response to determining that the driver is an authorized user, the onboard vehicle system may unlock the engine system, the ignition system, the brakes system, as well as other control system on the vehicle so that the user may start to operate the vehicle.

In a ride-sharing context that utilizes autonomous vehicles, one or more riders may request service. The request may be in the form of ushering in taxi service, or other forms of ride-sharing service. In the case of autonomous vehicles, the request may lead to the arrival of a driverless vehicle, such as a driverless car. In this context, a mechanism needs to be in place for the autonomous vehicle to authenticate the rider and for the rider to determine that the driverless car is the one that had been called for.

In one illustration from FIG. 3D, the user information of the person waiting to be serviced may be compared with information of subscribed riders (344). Comparison may be performed locally at the onboard vehicle system. Comparison may also be performed remotely by querying a database of the rider-sharing entity. The comparison may determine if the user has been a member of the ride-sharing club, or if the user has account ready to pay for the ride-sharing service. For the rider to be accommodated, the onboard vehicle system may verify to determine that the user's information agrees with rider information from, for example, a subscription database (344). The verification may include querying at a system of records and determining, for example, that the user's proffered identity is already in the system of records. In response to determining that the driver is a current subscriber and validating the user's identity, the onboard vehicle system may allow the user to enjoy the ride-sharing service.

When an autonomous vehicle arrives for ride-sharing service, the rider may want to determine that vehicle is indeed the one that the user had called for. In one illustration from FIG. 3E, the vehicle information may be received from the vehicle (322). This information may then be compared to a subscription database (354). Comparison may be performed remotely by querying a database of the rider-sharing entity. The comparison may determine if the vehicle that has just arrived indeed belongs to the rider-sharing entity. The vehicle may arrive as a driverless car or with a driver. In some cases, parents or relatives of the rider may want to determine that the driver is indeed duly licensed and qualified. That verification may generally follow the steps outline in FIG. 3D. Here, for a scrupulous rider to verify that the vehicle is legitimate for riding or driving, the vehicle information may be verified at a system of records to determine that the vehicle has duly registered.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An onboard vehicle system for controlling access to a vehicle, the onboard vehicle system comprising:
   a memory device; and
   a processor configured to execute instructions stored on the memory device, which when executed, cause the processor to at least:
   store, on the memory device, at least a first user account of a first user, the first user account associated with a first subset of privileges for controlling access to the vehicle;
   receive, from the first user, a second subset of privileges for controlling access to the vehicle by a second user;
   store, on the memory device, the second subset of privileges in association with a second user account of the second user;
   establish communication with a user device of the second user via a near field communication (NFC) protocol in response to the second user being in proximity with the vehicle;
   in response to establishing communication with the user device of the second user, receive user information included in a digital identification of the second user;
   compare the user information included in the digital identification of the second user to the second user account stored by the memory device;
   in response to comparing the user information to the second user account, retrieve the second subset of privileges from the memory device; and
   control vehicle access by the second user based upon the second subset of privileges, whereby the second user is enabled to control the vehicle in association with the second subset of privileges established by the first user.

2. The onboard vehicle system of claim 1, wherein the second subset of privileges includes a speed limit restriction, and wherein the instructions, when executed, further cause the processor to at least:
   apply the speed limit restriction to the vehicle access provided to the second user, whereby the second user is authorized to operate the vehicle only at speeds less than a speed limit associated with the speed limit restriction.

3. The onboard vehicle system of claim 1, wherein the second subset of privileges includes a pre-selected region for driving the vehicle, and wherein the instructions, when executed, further cause the processor to at least:
   apply the pre-selected region for driving the vehicle to the second user, whereby the second user is authorized to operate the vehicle only within the pre-selected region.

4. The onboard vehicle system of claim 1, wherein the memory device further stores a list of subscribed riders authorized to obtain transportation from the vehicle, and wherein the instructions, when executed, further cause the processor to at least:
   receive user information included in a digital identification of a third user in response to establishing communication with a user device of the third user;
   compare the user information included in the digital identification of the third user to the list of subscribed riders; and
   in response to comparing the user information included in the digital identification of the third user to the list of subscribed riders, determine whether the third user is authorized to obtain transportation from the vehicle.

5. The onboard vehicle system of claim 1, wherein the instructions, when executed, further cause the processor to at least:
   transmit driver information associated with a driver of the vehicle from the onboard vehicle system to a user device of a third user via the NFC protocol, wherein the user device of the third user is enabled to communicate with a computer system of a ride-sharing entity to obtain confirmation that the driver of the vehicle is authorized by the ride-sharing entity to operate the vehicle.

6. The onboard vehicle system of claim 5, wherein the driver of the vehicle is one of the first user or the second user, and wherein the instructions, when executed, further cause the processor to at least:
   transmit a digital identification of the one of the first user or the second user from the onboard vehicle system to the user device of the third user via the NFC protocol, whereby user device of the third user is enabled to display the digital identification of the one of the first user or the second user on a display device thereof, and whereby the third user is enabled to confirm that the one of the first user or the second user is authorized to operate the vehicle.

7. A method for controlling access to a vehicle, the method comprising:
   storing, by a processor and on a memory device, at least a first user account of a first user, the first user account associated with a first subset of privileges;
   receiving, by the processor and from the first user, a second subset of privileges for a second user;
   storing, by the processor and on the memory device, the second subset of privileges in association with a second user account of the second user;
   communicating, by the processor, with a user device of the second user via a near field communication (NFC) protocol;
   receiving, by the processor, user information included in a digital identification of the second user in response to communicating with the user device of the second user;
   comparing, by the processor, the user information included in the digital identification of the second user to the second user account stored by the memory device;
   in response to comparing the user information to the second user account, retrieving, by the processor, the second subset of privileges from the memory device; and
   controlling, by the processor, vehicle access by the second user based upon the second subset of privileges, whereby the second user is enabled to control the vehicle in association with the second subset of privileges established by the first user.

8. The method of claim 7, wherein the second subset of privileges includes a speed limit restriction, the method further comprising:
   applying, by the processor, the speed limit restriction to the vehicle access provided to the second user, whereby the second user is authorized to operate the vehicle only at speeds less than a speed limit associated with the speed limit restriction.

9. The method of claim 7, wherein the second subset of privileges includes a pre-selected region for driving the vehicle, the method further comprising:

applying, by the processor, the pre-selected region for driving the vehicle to the second user, whereby the second user is authorized to operate the vehicle only within the pre-selected region.

10. The method of claim 7, wherein the memory device further stores a list of subscribed riders authorized to obtain transportation from the vehicle, the method further comprising:
receiving, by the processor, user information included in a digital identification of a third user in response to communicating with a user device of the third user;
comparing, by the processor, the user information included in the digital identification of the third user to the list of subscribed riders; and
in response to comparing the user information included in the digital identification of the third user to the list of subscribed riders, determining, by the processor, whether the third user is authorized to obtain transportation from the vehicle.

11. The method of claim 7, further comprising:
transmitting, by the processor, driver information associated with a driver of the vehicle from the onboard vehicle system to a user device of a third user via the NFC protocol, wherein the user device of the third user is enabled to communicate with a computer system of a ride-sharing entity to obtain confirmation that the driver of the vehicle is authorized by the ride-sharing entity to operate the vehicle.

12. The method of claim 11, wherein the driver of the vehicle is one of the first user or the second user, the method further comprising:
transmitting, by the processor, a digital identification of the one of the first user or the second user from the onboard vehicle system to the user device of the third user via the NFC protocol, whereby user device of the third user is enabled to display the digital identification of the one of the first user or the second user on a display device thereof, and whereby the third user is enabled to confirm that the one of the first user or the second user is authorized to operate the vehicle.

13. An article of manufacture comprising a tangible, non-transitory, computer-readable storage medium having instructions stored thereon, which when executed by at least one computer processor, cause the at least one computer processor to at least:
store, on the memory device, at least a first user account of a first user, the first user account associated with a first subset of privileges for controlling access to the vehicle;
receive, from the first user, a second subset of privileges for controlling access to the vehicle by a second user;
store, on the memory device, the second subset of privileges in association with a second user account of the second user;
communicate with a user device of the second user via a near field communication (NFC) protocol in response to the second user being in proximity with the vehicle;
receive user information included in a digital identification of the second user in response to communicating with the user device of the second user;
compare the user information included in the digital identification of the second user to the second user account stored by the memory device;
in response to comparing the user information to the second user account, retrieve the second subset of privileges from the memory device; and control vehicle access by the second user based upon the second subset of privileges, whereby the second user is enabled to control the vehicle in association with the second subset of privileges established by the first user.

14. The article of claim 13, wherein the second subset of privileges includes at least one of i) a speed limit restriction, or ii) a pre-selected region for driving the vehicle, and wherein the instructions, when executed, further cause the processor to at least one of:
i) apply the speed limit restriction to the vehicle access provided to the second user, whereby the second user is authorized to operate the vehicle only at speeds less than a speed limit associated with the speed limit restriction, or
ii) apply the pre-selected region for driving the vehicle to the second user, whereby the second user is authorized to operate the vehicle only within the pre-selected region.

15. An onboard vehicle system for controlling access to a vehicle, the onboard vehicle system comprising:
a memory device; and
a processor configured to execute instructions stored on the memory device, which when executed, cause the processor to at least:
store, on the memory device, at least a first user account of a first user, the first user account associated with a first subset of privileges for controlling access to the vehicle;
receive, from the first user, a second subset of privileges for controlling access to the vehicle by a second user;
store, on the memory device, the second subset of privileges in association with a second user account of the second user;
establish communication with a user device of the second user via a near field communication (NFC) protocol in response to the second user being in proximity with the vehicle;
in response to establishing communication with the user device of the second user, receive user information included in a digital identification of the second user;
transmit the user information to a computer system of a sharing entity;
receive, from the computer system of the sharing entity, a determination whether the second user is authorized to access the vehicle; and
if the second user is authorized to access the vehicle, retrieve the second subset of privileges from the memory device; and
control vehicle access by the second user based upon the second subset of privileges, whereby the second user is enabled to control the vehicle in association with the second subset of privileges established by the first user.

16. The onboard vehicle system of claim 15, wherein the second subset of privileges includes a speed limit restriction, and wherein the instructions, when executed, further cause the processor to at least:
apply the speed limit restriction to the vehicle access provided to the second user, whereby the second user is authorized to operate the vehicle only at speeds less than a speed limit associated with the speed limit restriction.

17. The onboard vehicle system of claim 15, wherein the second subset of privileges includes a pre-selected region for driving the vehicle, and wherein the instructions, when executed, further cause the processor to at least:
apply the pre-selected region for driving the vehicle to the second user, whereby the second user is authorized to operate the vehicle only within the pre-selected region.

18. The onboard vehicle system of claim 15, wherein the memory device further stores a list of subscribed riders authorized to obtain transportation from the vehicle, and wherein the instructions, when executed, further cause the processor to at least:
receive user information included in a digital identification of a third user in response to establishing communication with a user device of the third user;
compare the user information included in the digital identification of the third user to the list of subscribed riders; and
in response to comparing the user information included in the digital identification of the third user to the list of subscribed riders, determine whether the third user is authorized to obtain transportation from the vehicle.

19. The onboard vehicle system of claim 15, wherein the instructions, when executed, further cause the processor to at least:
transmit driver information associated with a driver of the vehicle from the onboard vehicle system to a user device of a third user via the NFC protocol, wherein the user device of the third user is enabled to communicate with a computer system of a ride-sharing entity to obtain confirmation that the driver of the vehicle is authorized by the ride-sharing entity to operate the vehicle.

20. The onboard vehicle system of claim 15, wherein the driver of the vehicle is one of the first user or the second user, and wherein the instructions, when executed, further cause the processor to at least:
transmit a digital identification of the one of the first user or the second user from the onboard vehicle system to the user device of the third user via the NFC protocol, whereby user device of the third user is enabled to display the digital identification of the one of the first user or the second user on a display device thereof, and whereby the third user is enabled to confirm that the one of the first user or the second user is authorized to operate the vehicle.

\* \* \* \* \*